United States Patent
Schlosser et al.

(10) Patent No.: US 12,455,182 B2
(45) Date of Patent: Oct. 28, 2025

(54) MODE SPLITTING RESONATOR FOR CORIOLIS FLOWMETER BALANCE BAR

(71) Applicant: MICRO MOTION, INC., Boulder, CO (US)

(72) Inventors: Martin Andrew Schlosser, Boulder, CO (US); Frederick Scott Schollenberger, Oakland, CA (US)

(73) Assignee: MICRO MOTION, INC., Boulder, CO (US)

(*) Notice: Subject to any disclaimer, the term of this patent is extended or adjusted under 35 U.S.C. 154(b) by 654 days.

(21) Appl. No.: 17/800,048

(22) PCT Filed: Feb. 20, 2020

(86) PCT No.: PCT/US2020/019003
§ 371 (c)(1),
(2) Date: Aug. 16, 2022

(87) PCT Pub. No.: WO2021/167610
PCT Pub. Date: Aug. 26, 2021

(65) Prior Publication Data
US 2023/0073402 A1    Mar. 9, 2023

(51) Int. Cl.
*G01F 1/84* (2006.01)

(52) U.S. Cl.
CPC ............ *G01F 1/8418* (2013.01); *G01F 1/849* (2013.01)

(58) Field of Classification Search
CPC ...... G01F 1/849; G01F 1/8418; G01F 1/8413; G01F 1/84
USPC ..................... 73/861.354–861.357
See application file for complete search history.

(56) References Cited

U.S. PATENT DOCUMENTS

| | | | |
|---|---|---|---|
| 6,227,059 B1 | 5/2001 | Schott et al. | |
| 6,363,794 B1* | 4/2002 | Van Cleve | G01F 1/8418 73/861.357 |
| 6,487,917 B1* | 12/2002 | Van Cleve | G01F 1/849 73/861.357 |
| 6,494,106 B1 | 12/2002 | Cage et al. | |
| 7,337,676 B2* | 3/2008 | Hussain | G01F 1/8495 73/861.357 |
| 2005/0115335 A1 | 6/2005 | Gebhardt et al. | |
| 2011/0154914 A1 | 6/2011 | Hussain et al. | |

FOREIGN PATENT DOCUMENTS

| | | |
|---|---|---|
| CN | 109425396 A | 3/2019 |
| EP | 0831306 A1 | 3/1998 |
| JP | 2005250078 A | 9/2005 |
| JP | 2009180699 A | 8/2009 |
| WO | 2006014153 A1 | 2/2006 |
| WO | 2010059157 A1 | 5/2010 |

* cited by examiner

*Primary Examiner* — Kristina M Deherrera
*Assistant Examiner* — Truong D Phan
(74) *Attorney, Agent, or Firm* — The Ollila Law Group LLC

(57) ABSTRACT

A mode splitter (300) for a balance bar (150) of a Coriolis flow meter (100) is disclosed. The mode splitter (300) comprises a mass portion (302), and a first coupling portion (304a) coupled to the mass portion (302). The first coupling portion (304a) has a first stiffness in a drive direction (Y) and a second stiffness direction in an orthogonal direction (Z), and the orthogonal direction (Z) is orthogonal to both the drive direction (Y) and a longitudinal direction of the balance bar (150). The second stiffness is different than the first stiffness.

19 Claims, 7 Drawing Sheets

MODE SPLITTING RESONATOR FOR CORIOLIS FLOWMETER BALANCE BAR

TECHNICAL FIELD

The embodiments described below relate to Coriolis flow meter balance bars, and more particularly, splitting the modes of Coriolis flow meter balance bars.

BACKGROUND

Coriolis flow meters are a type of flow meter that may be used to measure the mass flow rate, density, volume flow rate, and other information for process fluids. Coriolis flow meters may include either a single flow tube with one or more associated balance bars, two flow tubes, or any additional number of flow tubes. The vibrating structure of a Coriolis flow meter is typically a dynamically balanced system. When Coriolis flow meters include a pair of flow tubes, for example, the flow tubes may be vibrated in phase opposition to form a dynamically balanced system. In Coriolis flow meters including a single flow tube, however, the flow tube is generally vibrated in phase opposition with a balance bar to form the dynamically balanced system. In further embodiments, however, a Coriolis flow meter with more than one flow tube may include a balance bar to provide a dynamically balanced system.

FIG. 1 depicts an example Coriolis flow meter 100 with a straight flow tube 130. Coriolis flow meter 100 may comprise a case 102. Brace bars 140, 140' may couple flow tube 130 to flow meter case 102. Brace bars 140 and 140' may further help define the axis about which flow tube 130 oscillates.

Flanges 103 and 103' are connected to a process conduit (not shown) carrying the fluid under measurement via inlet end 104 and exit end 104'.

Coriolis flow meter 100 further includes driver 180, which oscillates flow tube 130. Driver 180 may comprise any one of many well-known arrangements, such as a magnet mounted to flow tube 130 and an opposing coil mounted to a bracket 161, 161' using brazing, adhesive, fasteners, or any other coupling method known to those of skill. In further embodiments, however, any part of driver 180 may be mounted to balance bar 150, 150', or any other structure known to those of skill. An alternating driver current is passed through driver 180 to vibrate flow tube 130. In the example Coriolis flow meter 100 of FIG. 1, the drive direction is in the y-direction, which is vertical in the figure.

Coriolis flow meter 100 further includes a pair of pick-off sensors 170L and 170R. Pick-off sensors 170L and 170R may comprise any one of many well-known velocity, displacement, or acceleration pick-off sensor arrangements, such as a magnet mounted to flow tube 130 and an opposing coil mounted to brackets 160L, 160R. In further embodiments, however, any part of pick-off sensors 170L and 170R may be mounted to balance bar 150, 150', or any other structure using brazing, adhesive, fasteners, or any other coupling method known to those of skill. Pick-off sensors 170L and 170R measure the displacement of flow tube 130 as it vibrates. With no flow through flow tube 130, pick-off sensor 170L and 170R signals are in phase. Once flow begins through the vibrating tubes, however, a Coriolis force is induced on the tubes. In the example of Coriolis flow meter 100, pick-off sensors 170L and 170R determine movements of flow tube 130 in the drive direction, or the Y direction.

Meter electronics (not depicted) provide a drive signal to driver 180 to vibrate flow tube 130, receive the left and right velocity signals from velocity pick-off sensors 170L and 170R, and compute the mass flow rate, volumetric rate, and/or density information for the flow passing through Coriolis flow meter 100.

Example Coriolis flow meter 100 includes balance bars 150, 150' to dynamically balance the oscillations of flow tube 130. Each of balance bars 150, 150' extends in a longitudinal direction parallel to the axis of flow tube 130, and the two balance bars 150, 150' are positioned along opposing sides of flow tube 130. In the example Coriolis flow meter 100, balance bars 150, 150' are positioned on opposing sides of flow tube 130 in the Z direction. Balance bars 150, 150' are configured to oscillate in opposition to flow tube 130. In further embodiments, however, Coriolis flow meter 100 may include only one balance bar, or any number of balance bars known to those of skill. In further embodiments, balance bars 150, 150' may be coupled to flow tube 130 in different orientations.

Balance bars 150, 150' of example Coriolis flow meter 100 are connected to one another via one or more brackets 160L, 160R, 161, and 161'. In further embodiments, however, different arrangements of brackets may be possible, as will be understood by those of skill.

In the example of Coriolis flow meter 100, the cross section of the balance bar 150 is substantially square. This may be seen in FIG. 2, which depicts a cross section of balance bar 150, including Y-direction, which is aligned with the drive direction, and the Z-direction, which is orthogonal to the drive direction. By substantially square, what is meant is that the lengths of the cross section of balance bar 150 in the Y and Z directions are within 15% of one another. In further embodiments, however, the lengths of balance bar 150 in the Y and Z directions may be within 10% or 5% of one another.

The substantially square cross-sectional shape of balance bar 150 provides a stiffness that is substantially the same in the Y-direction and the Z-direction. When balance bar 150 moves in phase opposition with flow tube 130, example balance bar 150 tends to have a natural frequency in the Y-direction that is substantially the same as the natural frequency of the Z-direction. For example, using finite element analysis modeling for one balance bar design in the out of phase mode, the natural frequency in the Y-direction, or the drive direction, was determined to be approximately 498 Hz, or substantially equal the natural frequency in the Z-direction, 503 Hz. When the natural frequency of both Y and Z directions are substantially the same, or within 5% of one another, there may be an unwanted response from the Z-direction detected by pick-off sensors 170R, 170L in the Y-direction. This may decrease the accuracy of Coriolis flow meter measurements.

Because the meter accuracy is sensitive to the cross-sectional dimensions of balance bar 150, it is difficult to change the substantially square dimensions of the cross-section of balance bar 150 without affecting the flow meter performance. In particular, if balance bar 150 is too narrow in the Z-direction, the flow meter sensitivity to density may be affected. If balance bar 150 is too wide in the Z-direction, however, the vibrations in the Z-direction may be grounded, and therefore equal to the balanced Y-direction mode. For this reason, it is challenging to decouple vibrations between orthogonal modes of prior Coriolis flow meter balance bars, and some prior flow meters may have reduced accuracy as a result.

Balance bar 150 provides just one example of a balance bar cross-sectional shape that can produce cross-coupling of noise between the Y-direction and Z-direction. In further embodiments, balance bars with different cross-sectional shapes may feature stiffnesses that are substantially the same in the Y-direction and the Z-direction, thereby making cross-coupling of noise between the Y-direction and Z-direction more likely.

What is further needed is a way to prevent cross-coupling of noise in a balance bar between the Y-direction and Z-direction to improve the Coriolis flow meter accuracy.

SUMMARY

A mode splitter for a balance bar or a flow tube of a Coriolis flow meter is provided according to a first embodiment. The mode splitter comprises a mass portion and a first coupling portion coupled to the mass portion. The first coupling portion has a first stiffness in a drive direction and a second stiffness in an orthogonal direction, the orthogonal direction being orthogonal to both the drive direction and a longitudinal direction of the balance bar, the second stiffness being different than the first stiffness.

A Coriolis flow meter is provided according to a second embodiment. The Coriolis flow meter comprises a flow tube, a driver configured to oscillate the flow tube, at least one pick-off sensor configured to measure a motion of the flow tube, a first balance bar, and a first mode splitter coupled to at least one of the first balance bar or the flow tube. The first mode splitter comprises a mass portion and a first coupling portion coupled to the mass portion, wherein the first coupling portion has a first stiffness in a drive direction and a second stiffness in an orthogonal direction, the orthogonal direction being orthogonal to both the drive direction and a longitudinal direction of the balance bar, the second stiffness being different than the first stiffness.

A method for assembling the Coriolis flow meter is provided according to a third embodiment. The method comprises providing a flow tube, coupling a driver configured to oscillate the flow tube to the flow tube, coupling at least one pick-off sensor configured to measure a motion of the flow tube to the flow tube, coupling a brace bar to the flow tube, coupling a balance bar to the brace bar, and coupling a mode splitter to at least one of the flow tube or the balance bar. The mode splitter comprises a mass portion and a first coupling portion coupled to the mass portion, wherein the first coupling portion has a first stiffness in a drive direction and a second stiffness in an orthogonal direction, the orthogonal direction being orthogonal to both the drive direction and a longitudinal direction of the balance bar, the second stiffness being different than the first stiffness Aspects According to an aspect, the second stiffness may be greater than the first stiffness.

According to an aspect, the mass portion may have a first end and a second end at opposing ends of the mass portion, the first coupling portion may be coupled to the first end of the mass portion, and the mode splitter may further comprise a second coupling portion coupled to the second end of the mass portion.

According to an aspect, the second coupling portion may have a third stiffness in the drive direction and a fourth stiffness in the orthogonal direction, the fourth stiffness being greater than the third stiffness.

According to an aspect, the first coupling portion may have a second dimension in the orthogonal direction that is substantially greater than a first dimension in the drive direction.

According to an aspect, the second stiffness may be greater than the first stiffness.

According to an aspect, the mass portion may have first end and a second end at opposing ends of the mass portion, the first coupling portion may be coupled to the first end of the mass portion, and the mode splitter may further comprise: a second coupling portion coupled to the second end of the mass portion.

According to an aspect, the second coupling portion may have a third stiffness in the drive direction and a fourth stiffness in the orthogonal direction, the fourth stiffness being greater than the third stiffness.

According to an aspect, the first coupling portion may have a second dimension in the orthogonal direction that is substantially greater than a first dimension in the drive direction.

According to an aspect, the first mode splitter may be configured to provide a combined first balance bar and first mode splitter natural frequency in the orthogonal direction that is at least five percent lower than a first balance bar without mode splitter natural frequency in the orthogonal direction.

According to an aspect, the first mode splitter may be configured to provide a combined first balance bar and first mode splitter natural frequency in the orthogonal direction that is at least ten percent lower than a first balance bar without mode splitter natural frequency in the orthogonal direction.

According to an aspect, the mode splitter may be configured to have a combined first balance bar and mode splitter natural frequency in the drive direction that is within one percent of a first balance bar without mode splitter natural frequency in the drive direction.

According to an aspect, the first balance bar may have a substantially square cross-sectional area.

According to an aspect, the Coriolis flow meter may further comprise a second balance bar coupled to the first balance bar using one or more brackets.

According to an aspect, the Coriolis flow meter may further comprise a second balance bar, and a second mode splitter coupled to at least one of the flow tube or the second balance bar.

According to an aspect, the flow tube may be straight.

According to an aspect, the step of coupling the balance bar to the brace bar may further comprise coupling a first balance bar to the brace bar, coupling a second balance bar to the brace bar, and coupling the first balance bar to the second balance bar using one or more brackets.

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 3:
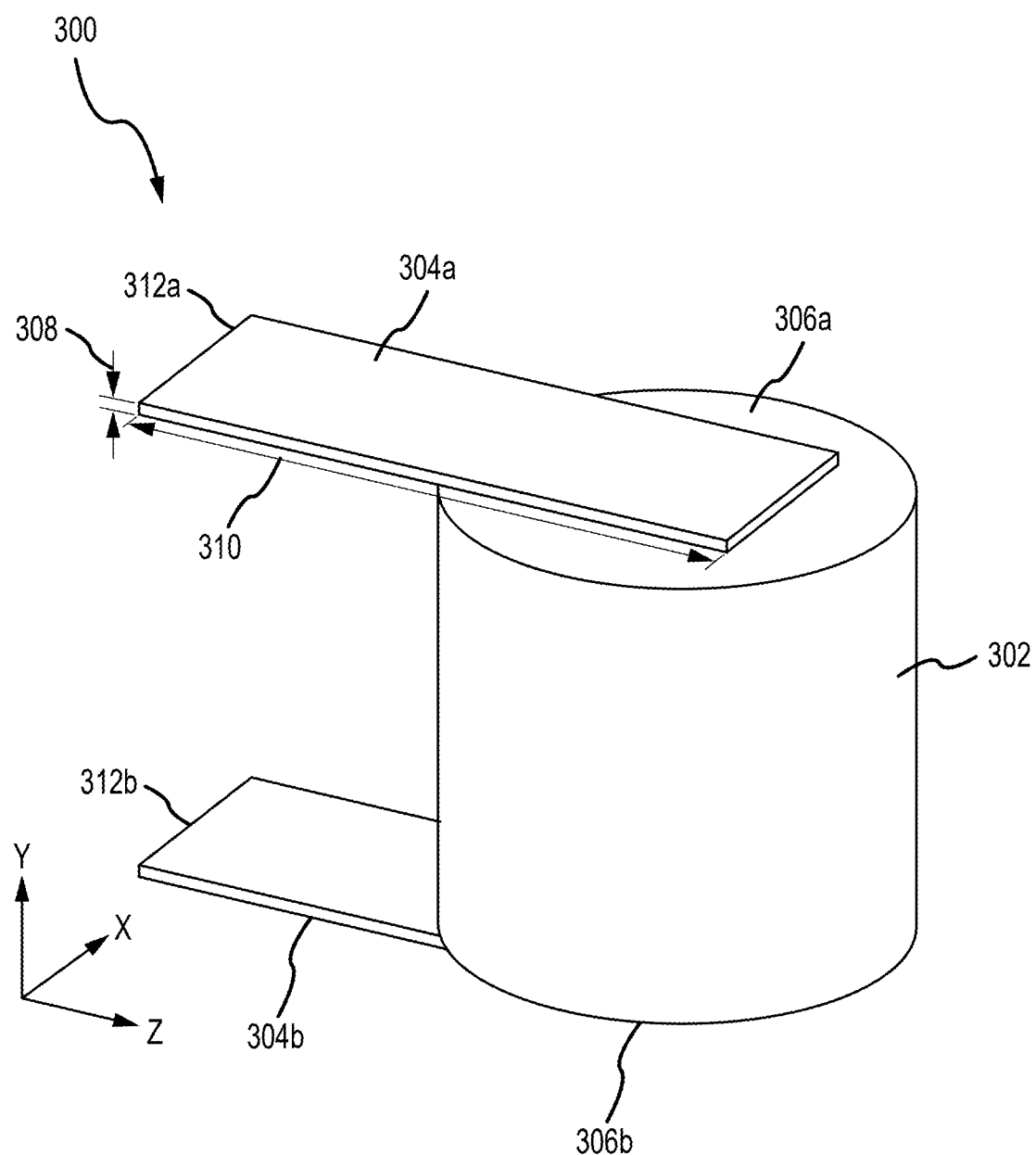
FIG. 3 depicts a mode splitter 300, in accordance with an embodiment.

FIG. 3 depicts a mode splitter 300, in accordance with an embodiment. Mode splitter 300 may be coupled to at least one of flow tube 130 or balance bar 150, 150' of Coriolis flow meter 700 described below with reference to FIG. 7 to decouple the vibrations between a vibrational mode in the drive direction and a vibrational mode in an orthogonal direction.

The mode splitter 300 comprises a mass portion 302 and a first coupling portion 304a. The mass portion 302 comprises the central body of the mode splitter. In the example of mode splitter 300, the mass portion 302 has a cylindrical shape with a diameter of one inch and a height of one inch. This is not intended to be limiting, however. In further embodiments, mass portion 302 may comprise any size or shape, as will be understood by those of skill in the art.

In embodiments, mass portion 302 may be formed from a high-density material, such as tungsten. In further embodiments, however, mass portion 302 may be formed from any material known to those of skill in the art.

First coupling portion 304a is coupled to the mass portion 302. First coupling portion 304a is configured to couple mass portion 302 to the balance bar 150 as described below with reference to FIG. 7, or a fixture coupled to the balance bar 150. First coupling portion 304a couples to mass portion 302 at a first end, and to balance bar 150, or a flow meter fixture, at a second end opposing the first end.

Figure 7:
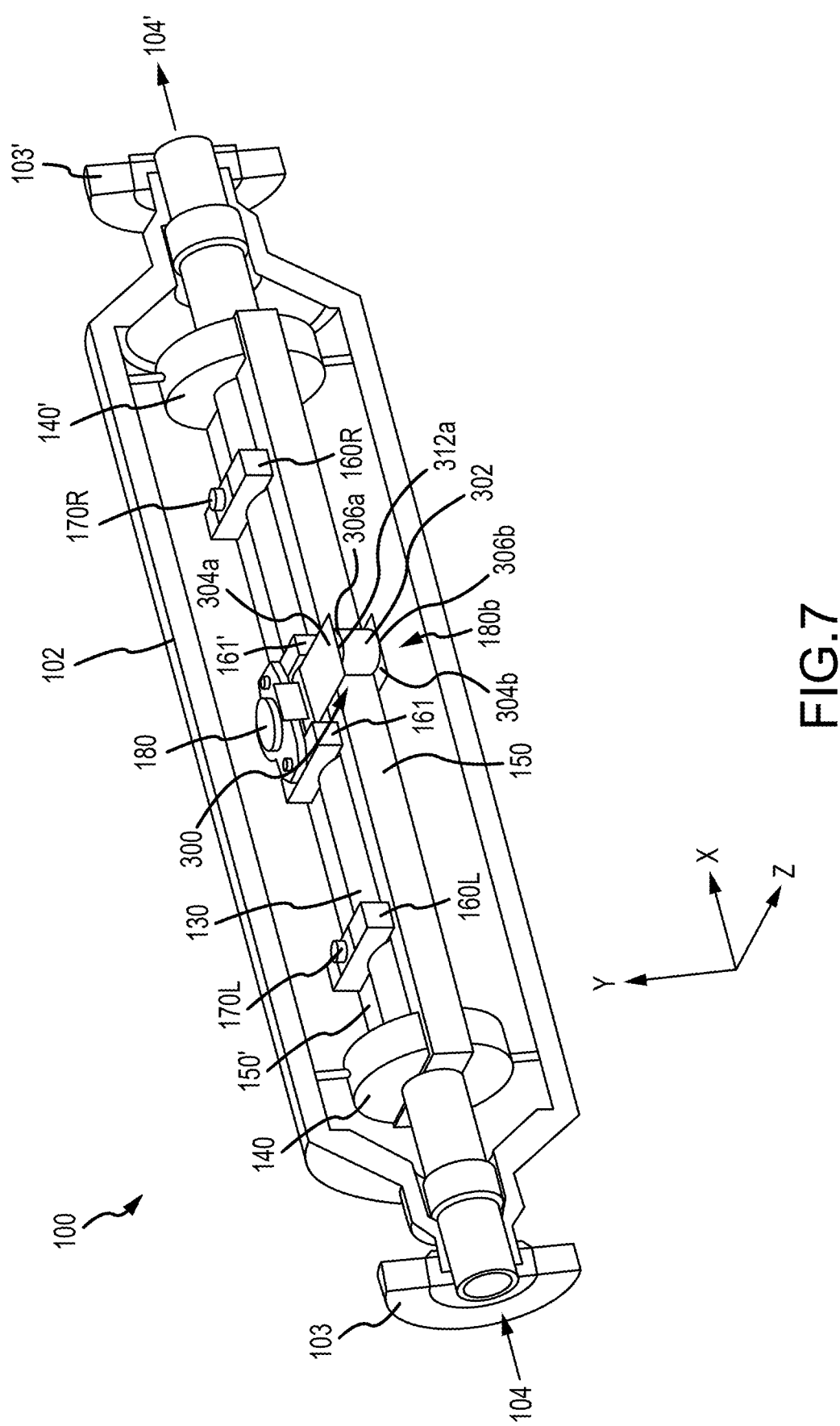
FIG. 7. depicts a Coriolis flow meter 700, in accordance with an embodiment.

First coupling portion 304a has a first stiffness in a drive direction and a second stiffness in an orthogonal direction, the orthogonal direction being orthogonal to both the drive direction and a longitudinal direction of the balance bar, and the second stiffness being greater than the first stiffness. In FIGS. 3 and 7, it may be seen that the drive direction is in the Y-direction, the longitudinal direction, which follows the length of the balance bar 150 and flow tube 130, is in the X-direction, and the orthogonal direction is in the Z-direction.

In embodiments, first coupling portion 304a may be cut from a sheet of stainless steel, for example 304SS. In further embodiments, however, first coupling portion 304a may comprise any material known to those of skill and comprise any configuration that allows the second stiffness in the orthogonal direction Z to be greater than the first stiffness in the drive direction Y.

In the embodiment of mode splitter 300, first coupling portion 304a comprises a flat, rectangle with two planar faces. In embodiments, first coupling portion 304a may be 0.5 inches long in longitudinal direction X, 1.5 inches long in orthogonal direction Z, and 0.024 inches thick in drive direction Y. By providing a first coupling portion 304a that is much longer in drive direction Y than orthogonal direction Z, first coupling portion 304a may be configured to be different in orthogonal direction Z than drive direction Y. In the embodiment of mode splitter 300, first coupling portion 304a is configured to be stiffer in orthogonal direction Z than drive direction Y. In further embodiments, however, first coupling portion 304a may comprise any configuration that allows the second stiffness in orthogonal direction Z to be different than the first stiffness in drive direction Y. For example, first coupling portion 304a may comprise a carbon fiber composite material, with the fibers arranged so as to provide a second stiffness in orthogonal direction Z that is greater than a first stiffness in drive direction Y.

In embodiments, first coupling portion 304a and mass portion 302 may be formed as a single integrated body. In further embodiments, however, first coupling portion 304a and mass portion 302 may be formed as separate portions that are coupled together.

Upon coupling mode splitter 300 to flow tube 130 or balance bar 150 as shown in FIG. 7, mass portion 302 is weakly coupled to flow tube 130 or balance bar 150 in the drive direction Y and strongly coupled to flow tube 130 or balance bar 150 in the orthogonal direction Z. This may help isolate vibrations from the orthogonal mode in the Z-direction from 30 the drive mode in the Y-direction, thereby increasing meter accuracy.

In embodiments, mass portion 302 has a first end and a second end at opposing ends. In the embodiment of FIG. 3, it may be seen that mass portion 302 has a first end 306a and a second end 306b at opposing ends of the cylinder that forms the body of mass portion 302. First coupling portion 304a is coupled to the first end 306a of the mass portion 302.

In embodiments, mode splitter 300 may further comprise a second coupling portion coupled to the second end of the mass portion. For example, as may be seen in FIG. 3, second coupling portion 304b may be coupled to second end 306b of mass portion 302. In embodiments, second coupling portion 304b may be similar in form and features to first coupling portion 304a. By providing mode splitter 300 with two coupling portions 304a, 304b positioned at opposing ends 306a, 306b of mass portion 302, it may be possible to provide a balanced mode splitter 300 that splits and separates orthogonal mode and the drive mode frequencies, and reduces the off-resonance response of the Z mode at the drive frequency.

In embodiments, the second coupling portion 304b may have a third stiffness in the drive direction Y and a fourth stiffness in the orthogonal direction Z, the fourth stiffness being greater than the third stiffness. In embodiments, the third stiffness may be the same as the first stiffness, and the fourth stiffness may be the same as the second stiffness.

In embodiments, the first coupling portion 304a may comprise a second dimension in the orthogonal direction Z that is substantially greater than a first dimension in the drive direction Y. For example, as may be seen in the embodiment of FIG. 3, coupling portion 304a has a first dimension 308 in the drive direction Y and a second dimension 310 in the orthogonal direction Z. First dimension 308 is no more than 5% of the length of second dimension 310. In further embodiments, however, first dimension 308 is no more than 15% or 10% of the length of second dimension 310, however.

Figure 4:
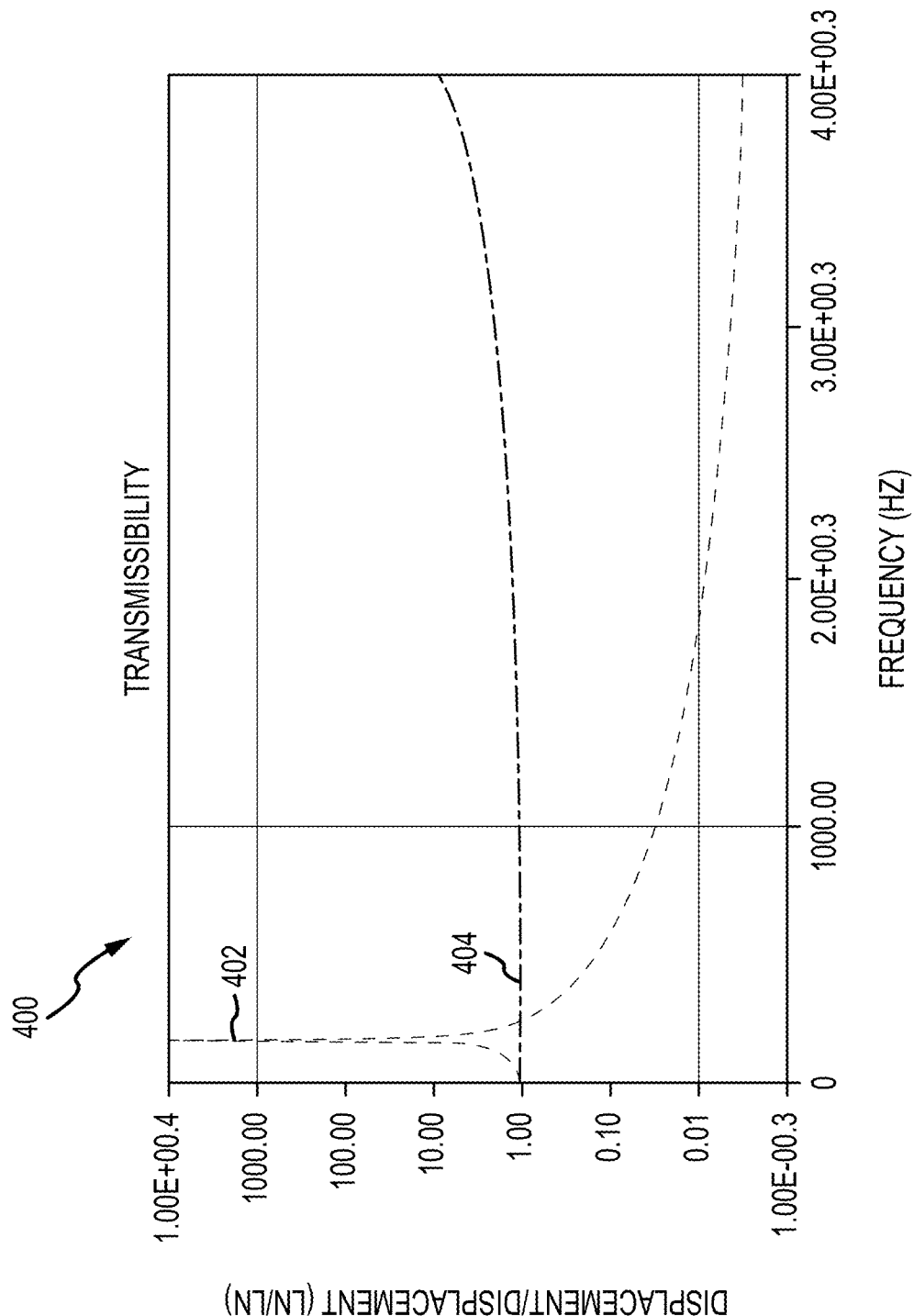
FIG. 4 depicts a chart 400, in accordance with an embodiment.

FIG. 4 demonstrates how mode splitter 300 may help separate the drive mode from the orthogonal mode. FIG. 4 depicts chart 400, which provides the transmissibility, or the ratio of output displacement over input displacement as a function of frequency for the drive direction Y and the orthogonal direction at a position where mode splitter 300 is coupled to balance bar 150. For example, in FIGS. 3 and 7 it may be seen that mode splitter 300 may be coupled to balance bar 150 at coupling positions 312a and 312b, which are at opposing ends of first and second coupling portions 304a, 304b. Drive transmissibility curve 402 depicts transmissibility in the orthogonal direction Z, and orthogonal transmissibility curve 404 depicts transmissibility in the drive direction Y.

FIG. 4 illustrates the frequency response of mode splitter 300 to vertical (driving, Y-direction of flowmeter) and horizontal inputs (Z-direction of flowmeter) where it attaches to balance bar 150. As may be seen, drive transmissibility curve 402 has a large peak at 164 Hz. By providing a mode splitter 300 with a frequency response peak at 164 Hz, mode splitter 300 may lower the natural frequency of the balance bar 150 below the drive frequency of 500 Hz in the drive direction Y when the mode splitter 300 is coupled to the flow tube 130 or the balance bar 150. In embodiments, mode splitter 300 may be configured to provide a drive transmissibility curve 402 with an even lower frequency peak. For example, if the mass of mass portion 302 is increased, drive transmissibility curve 402 may provide an even lower frequency response peak.

It may be readily seen from FIG. 4 that drive transmissibility curve 402 responds with no amplification, and consequently is in phase, at frequencies well below resonance. Above resonance, however, drive transmissibility curve 402 is attenuated as input energy rapidly loses its ability to move the resonant mass. In embodiments, drive transmissibility curve 402 may provide a peak response frequency that is below the frequency of the drive mode in the drive direction Y. In this way, it may be possible to attenuate the motion of the mode splitter 300 in the drive mode in the drive direction Y.

Chart 400 depicts that orthogonal transmissibility curve 404 has a peak frequency well above the drive frequency of 500 Hz at around 5000 Hz (not depicted in FIG. 4). This may allow mode splitter 300 to move in phase (as a rigid attachment) with balance bar 150 in the orthogonal direction Z, thereby providing a lower bend frequency (due to additional rigidly coupled mass) in orthogonal direction Z once mode splitter 300 is attached to the balance bar 150.

FIG. 7 depicts an example Coriolis flow meter 700 with a straight flow tube 130. As shown in FIG. 7, Coriolis flow meter 700 includes the same features as Coriolis flow meter 100 shown in FIG. 1. Accordingly, Coriolis flow meter 700 includes case 102 and brace bars 140, 140' that couple flow tube 130 to flow meter case 102. Flanges 103 and 103' are connected to a process conduit (not shown) carrying the fluid under measurement via inlet end 104 and exit end 104'. Coriolis flow meter 700 also includes driver 180, which oscillates flow tube 130. Driver 180 may comprise any one of many well-known arrangements, such as a magnet mounted to flow tube 130 and an opposing coil mounted to brackets 161, 161'. In embodiments, first mode splitter 300 may be coupled to a flow tube or a first balance bar of a Coriolis flow meter. For example, as shown in FIG. 7, the first mode splitter 300 is coupled to Coriolis flow meter 700 comprising flow tube 130, driver 180 configured to oscillate flow tube 130, at least one pick-off sensor 170R, 170L configured to measure a motion of flow tube 130, and balance bar 150, as described above.

In embodiments, first mode splitter 300 may be coupled to a central longitudinal position of flow tube 130 or balance bar 150 so that the drive direction Y of first mode splitter 300 aligns with the drive direction of Coriolis flow meter 100. In embodiments, first mode splitter 300 may be positioned adjacent to driver 180. In further embodiments, however, first mode splitter 300 may be coupled along any other longitudinal portion of flow tube 130 or balance bar 150, as will be understood by those of skill.

For example, in Figure it may be seen that balance bar 150 includes a first coupling position 180a on a face of balance bar 150 facing driver 180. Balance bar 150 may also comprise a second coupling position 180b that is not visible in the figure, positioned under balance bar 150 to face in a direction opposite driver 180. In embodiments, mode splitter 300 may be coupled to balance bar 150 between first coupling positions 312a and 180a and second coupling positions 312b and 180b via any method known to those of skill, including, but not limited to, brazing or using adhesive. The example of Coriolis flow meter 700 is not intended to be limiting, however. In further embodiments, mode splitter 300 may be coupled at a single point, or more than two points to balance bar 150. In addition, mode splitter 300 may be coupled to different faces of balance bar 150.

In embodiments, first balance bar 150 and first coupling portion 304a may have a combined first stiffness in the drive direction Y and a combined second stiffness in the orthogonal direction Z, the second stiffness being different than the first stiffness. In embodiments, the second stiffness may be greater than the first stiffness. This may further provide for a de-coupling between the orthogonal and drive mode vibrations.

In embodiments, the first mode splitter 300 may be configured to provide a combined first balance bar and first mode splitter natural frequency in the orthogonal direction Z that is at least 5 percent lower than a first balance bar without mode splitter natural frequency in the orthogonal direction Z. In further embodiments, however, the combined first balance bar and first mode splitter natural frequency in the orthogonal direction Z may be at least 10 or 15 percent lower than a first balance bar without mode splitter natural frequency in the orthogonal direction Z.

For example, in the examples provided above where balance bar 150 has a natural frequency in the orthogonal direction Z of 503 Hz, and mode coupler 300 provides frequency response peak at 164 Hz in the orthogonal direction Z, the combined first balance bar and first mode splitter natural frequency in the orthogonal direction Z may be 452 Hz, or approximately 11 percent lower than the natural frequency of balance bar 150 in the orthogonal direction Z.

In embodiments, the mode splitter may be configured to have a combined first balance bar and mode splitter natural frequency in the drive direction that is within one percent of a first balance bar without mode splitter natural frequency in the drive direction.

For example, in the same example provided above, balance bar 150 has a natural frequency in the drive direction Y of 497 Hz, and mode splitter 300 provides frequency response peak at 5000 Hz in the drive direction Y. The combined first balance bar and first mode splitter natural frequency in the drive direction Y may therefore be 505 Hz, which is substantially the same as the balance bar 150 natural frequency in the drive direction Y of 497 Hz.

In this way, mode splitter 300 may help isolate vibrations from the drive and orthogonal modes of the balance bar 150.

In further embodiments, a second balance bar may be coupled to the first balance bar using one or more brackets.

Figure 1:
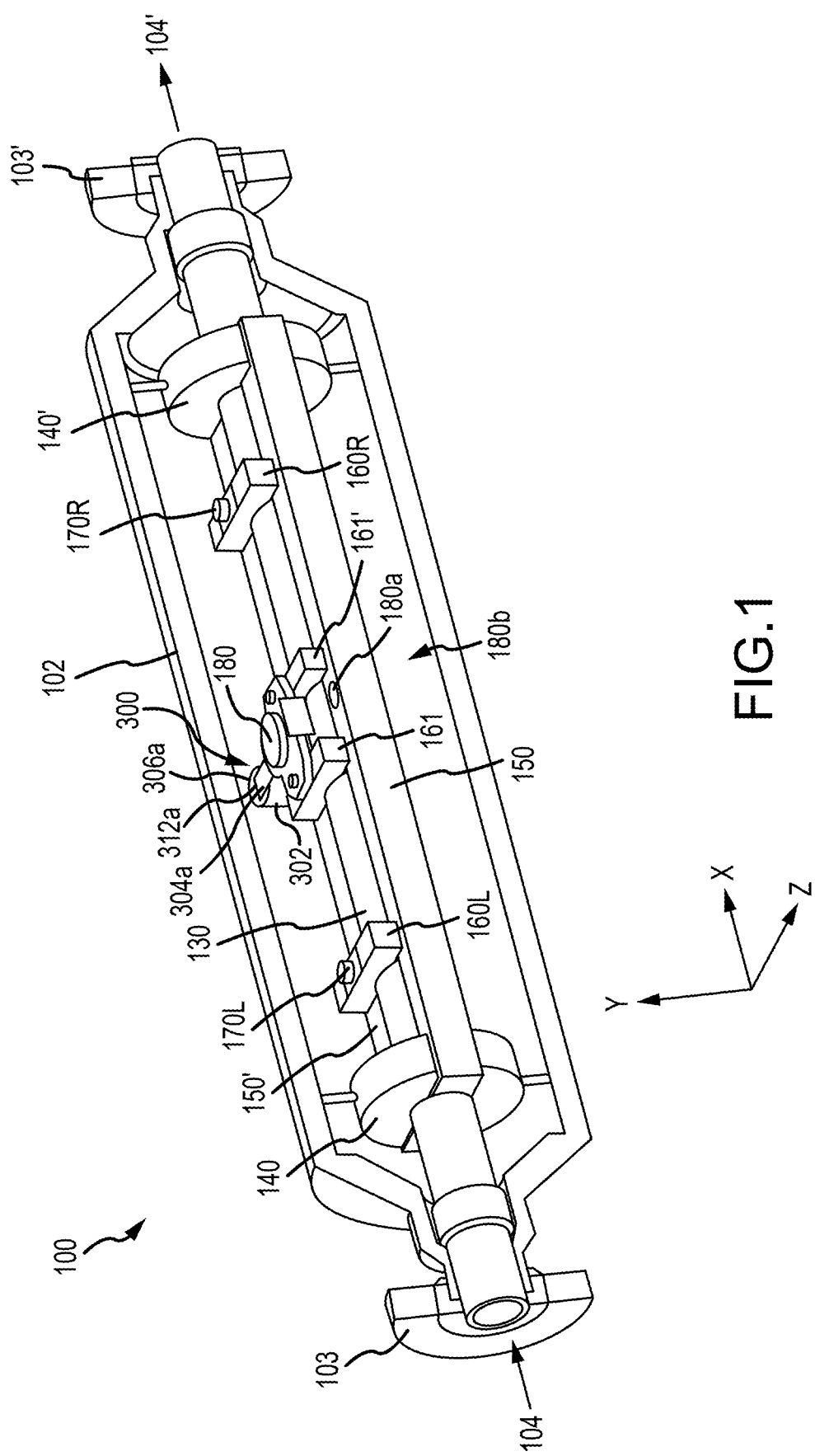
FIG. 1 depicts a Coriolis flow meter 100, in accordance with an embodiment.
Figure 2:
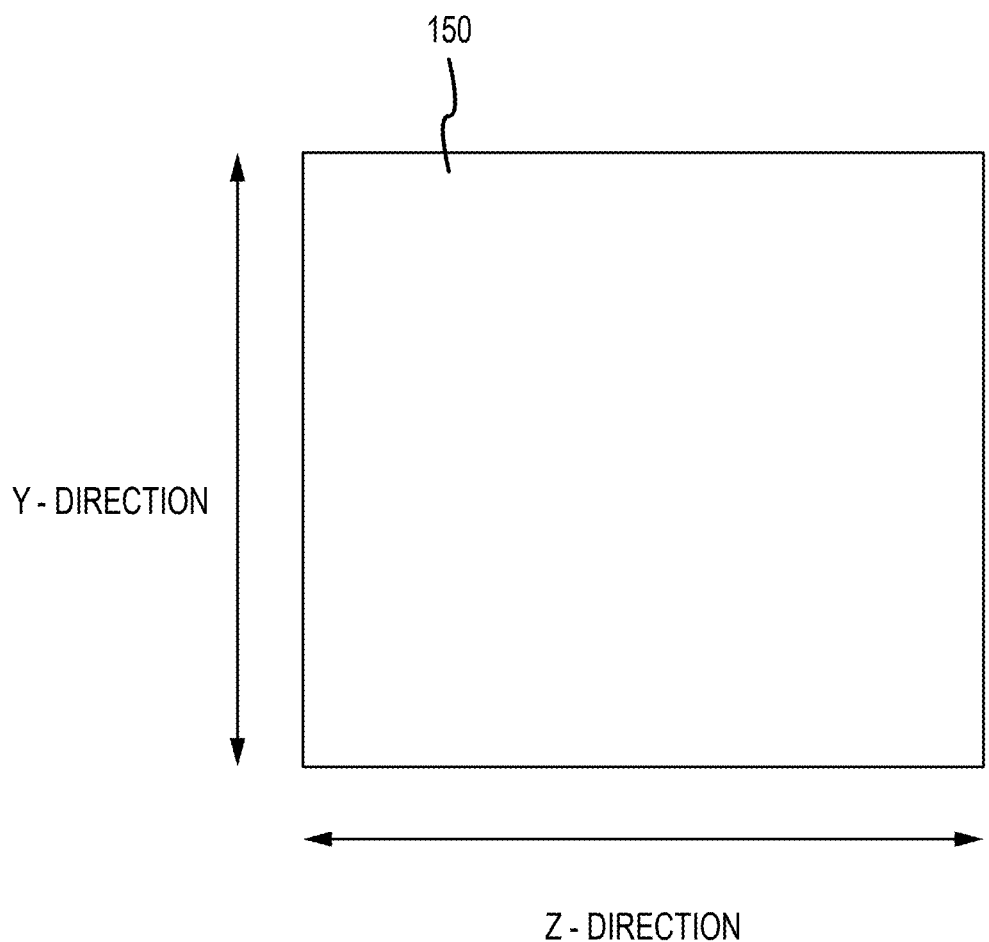
FIG. 2 depicts a balance bar 150, in accordance with an embodiment.

For example, FIG. 1 depicts a second balance bar 150' that is coupled to first balance bar 150 via brackets 160L, 160R, 161, 161'. Second balance bar 150' may also be coupled to flow tube 130 via brace bars 140, 140'.

In the example of Coriolis flow meter 700, brackets 160L and 160R further provide a mount for first and second pick off sensors 170R, 170L, and brackets 161, 161' further provide a mount for driver 180. This is not intended to be limiting, however. As those of skill will readily understand, the one or more brackets 160L, 160R, 161, 161' may be coupled anywhere along the longitudinal length of balance bars 150, 150', and may or may not provide a mount for further flow meter components.

In embodiments, Coriolis flow meter 700 may further comprise a second balance bar 150', and a second mode splitter 300 coupled to flow tube 130 or second balance bar 150'. In embodiments, the coupling between flow tube 130 or second balance bar 150' and second mode splitter 300 may be similar or different to that described for flow tube 130 or first balance bar 150 and first mode splitter 300 described above.

Figure 5:
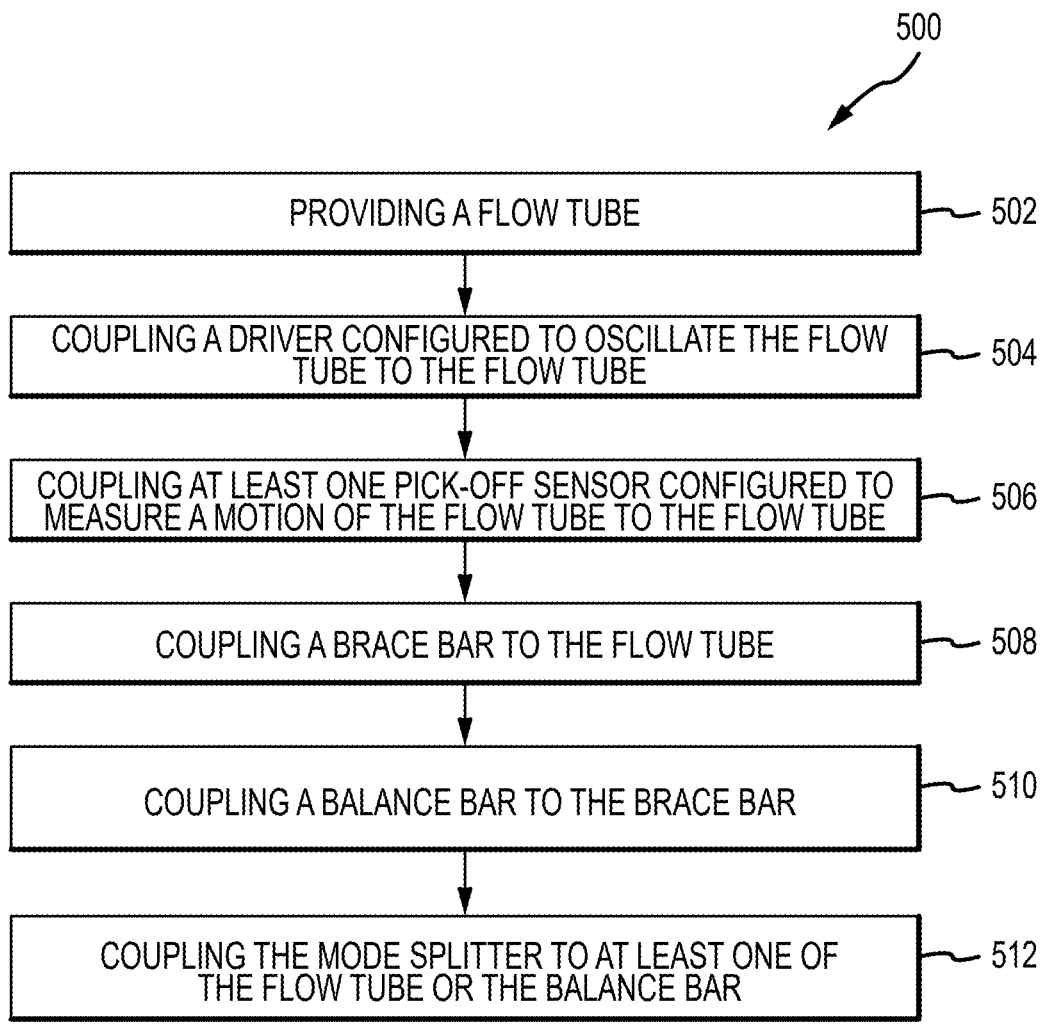
FIG. 5 depicts a method 500, in accordance with an embodiment.

FIG. 5 depicts a method 500 in accordance with an embodiment. Method 500 may be used to assemble Coriolis flow meter 700. Method 500 begins with step 502. In step 502, a flow tube is provided. For example, flow tube 130 may be provided, as described above.

Method 500 continues with step 504. In step 504, a driver configured to oscillate the flow tube is coupled to the flow tube. For example, driver 180 may be provided, as described above.

Method 500 continues with step 506. In step 506, at least one pick-off sensor configured to measure a motion of a flow tube is coupled to the flow tube. For example, pick-off sensor 170R, 170L may be coupled to the flow tube 130 described above.

Method 500 continues with step 508. In step 508, a brace bar is coupled to the flow tube. For example, brace bar 140 may be coupled to flow tube 130, as described above.

Method 500 continues with step 510. In step 510, a balance bar is coupled to the brace bar. For example, balance bar 150 may be coupled to brace bar 140, as described above.

Figure 6:
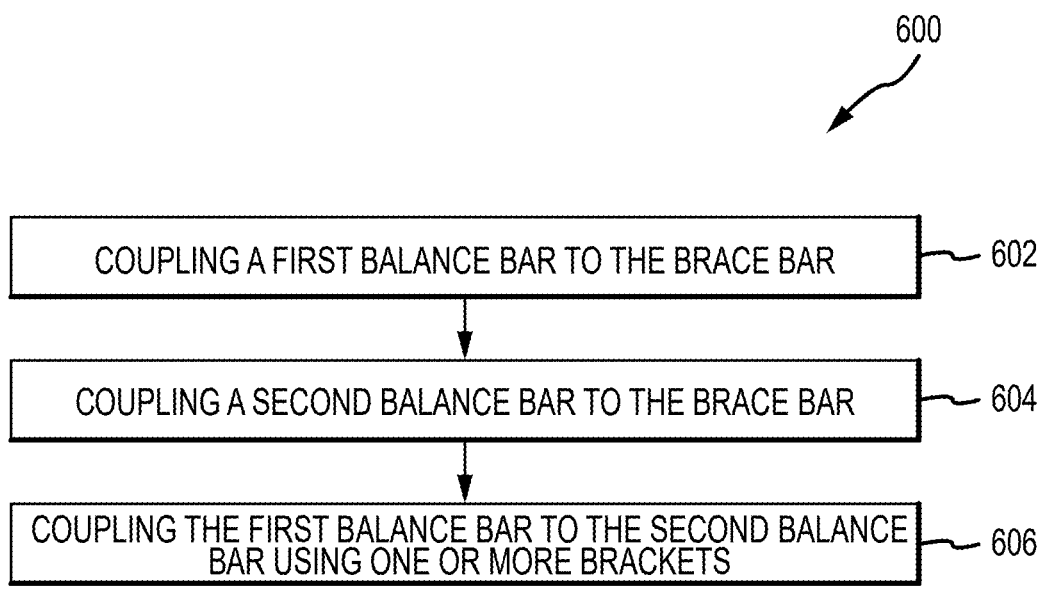
FIG. 6 depicts a method 600, in accordance with an embodiment.

FIG. 6 depicts method 600, in accordance with an embodiment. In embodiments, step 510 may further comprise the steps of method 600. Method 600 begins with step 602. In step 602, a first balance bar may be coupled to the brace bar. For example, first balance bar 150 may be coupled to brace bar 140, as described above.

Method 600 continues with step 604. In step 604, a second balance bar may be coupled to the brace bar. For example, second balance bar 150' may be coupled to brace bar 140, as described above.

Method 600 continues with step 606. In step 606, the first balance bar may be coupled to the second balance bar using one or more brackets. For example, first balance bar 150 may be coupled to second balance bar 150' using one or more brackets 160L, 160R, 161, 161', as described above.

Method 500 continues with step 512. In step 512, the mode splitter is coupled to at least one of the flow tube or the balance bar. For example, mode splitter 300 may be coupled to balance bar 150, as described above.

Thus, although specific embodiments are described herein for illustrative purposes, various equivalent modifications are possible within the scope of the present description, as those skilled in the relevant art will recognize. The teachings provided herein may be applied to other embodiments, and not just to the embodiments described above and shown in the accompanying figures. Accordingly, the scope of the embodiments described above should be determined from the following claims.

We claim:

1. A mode splitter (300) for coupling to a balance bar (150) or a flow tube (130) of a Coriolis flow meter (700), the mode splitter (300) comprising:
   a mass portion (302); and
   a first coupling portion (304a) coupled to the mass portion (302), wherein the first coupling portion (304a) has a first stiffness in a drive direction (Y) and a second stiffness in an orthogonal direction (Z), the orthogonal direction (Z) being orthogonal to both the drive direction (Y) and a longitudinal direction of the balance bar (150), the second stiffness being different than the first stiffness.

2. A mode splitter (300) as claimed in claim 1, wherein the second stiffness is greater than the first stiffness.

3. A mode splitter (300) as claimed in claim 1, wherein the mass portion (302) has a first end (306a) and a second end (306b) at opposing ends of the mass portion (302), the first coupling portion (304a) is coupled to the first end (306a) of the mass portion (302), and the mode splitter (300) further comprises:
   a second coupling portion (304b) coupled to the second end (306b) of the mass portion (302).

4. A mode splitter (300) as claimed in claim 3, wherein the second coupling portion (304b) has a third stiffness in the drive direction (Y) and a fourth stiffness in the orthogonal direction (Z), the fourth stiffness being greater than the third stiffness.

5. A mode splitter (300) as claimed in claim 1, wherein the first coupling portion (304a) has a second dimension (310) in the orthogonal direction (Z) that is substantially greater than a first dimension (308) in the drive direction (Y).

6. A Coriolis flow meter (700) comprising:
   a flow tube (130);
   a driver (180) configured to oscillate the flow tube (130);
   at least one pick-off sensor (170L, 170R) configured to measure a motion of the flow tube (130);
   a first balance bar (150); and
   a first mode splitter (300) coupled to at least one of the first balance bar (150) or the flow tube (130), the first mode splitter (300) comprising:
   a mass portion (302); and
   a first coupling portion (304a) coupled to the mass portion (302), wherein the first coupling portion (304a) has a first stiffness in a drive direction (Y) and a second stiffness in an orthogonal direction (Z), the orthogonal direction (Z) being orthogonal to both the drive direction (Y) and a longitudinal direction of the balance bar (150), the second stiffness being different than the first stiffness.

7. A Coriolis flow meter (700) as claimed in claim 6, wherein the second stiffness is greater than the first stiffness.

8. A Coriolis flow meter (700) as claimed in claim 6, wherein the mass portion (302) has a first end (306a) and a second end (306b) at opposing ends of the mass portion (302), the first coupling portion (304a) is coupled to the first end (306a) of the mass portion (302), and the mode splitter (300) further comprises:
   a second coupling portion (304b) coupled to the second end (306b) of the mass portion (302).

9. A Coriolis flow meter (700) as claimed in claim 6, wherein the second coupling portion (304b) has a third stiffness in the drive direction (Y) and a fourth stiffness in the orthogonal direction (Z), the fourth stiffness being greater than the third stiffness.

10. A Coriolis flow meter (700) as claimed in claim 6, wherein the first coupling portion (304a) has a second dimension (310) in the orthogonal direction (Z) that is substantially greater than a first dimension (308) in the drive direction (Y).

11. A Coriolis flow meter (700) as claimed in claim 6, wherein the first mode splitter (300) is configured to provide a combined first balance bar and first mode splitter natural frequency in the orthogonal direction (Z) that is at least five percent lower than a first balance bar without mode splitter natural frequency in the orthogonal direction (Z).

12. A Coriolis flow meter (700) as claimed in claim 6, wherein the first mode splitter (300) is configured to provide a combined first balance bar and first mode splitter natural frequency in the orthogonal direction (Z) that is at least ten percent lower than a first balance bar without mode splitter natural frequency in the orthogonal direction (Z).

13. A Coriolis flow meter (700) as claimed in claim 6, wherein the mode splitter (300) is configured to have a combined first balance bar and mode splitter natural frequency in the drive direction (Y) that is within one percent of a first balance bar without mode splitter natural frequency in the drive direction (Y).

14. A Coriolis flow meter (700) as claimed in claim 6, wherein the first balance bar (150) has a substantially square cross-sectional area.

15. A Coriolis flow meter (700) as claimed in claim 6, further comprising a second balance bar (150') coupled to the first balance bar (150) using one or more brackets (160L, 160R, 161, 161').

16. A Coriolis flow meter (700) as claimed claim 6, further comprising a second balance bar (150'), and a second mode splitter (300) coupled to at least one of the flow tube (130) or the second balance bar (150').

17. A Coriolis flow meter (700) as claimed in claim 6, wherein the flow tube (130) is straight.

18. A method for assembling the Coriolis flow meter (700), the method comprising:
providing a flow tube (130);
coupling a driver (180) configured to oscillate the flow tube (130) to the flow tube (130);
coupling at least one pick-off sensor (170L, 170R) configured to measure a motion of the flow tube (130) to the flow tube (130);
coupling a brace bar (140, 140') to the flow tube (130);
coupling a balance bar (150) to the brace bar (140, 140'); and
coupling a mode splitter (300) to at least one of the flow tube (130) or the balance bar (150), the mode splitter (300) comprising: a mass portion (302); and
a first coupling portion (304a) coupled to the mass portion (302), wherein the first coupling portion (304a) has a first stiffness in a drive direction (Y) and a second stiffness in an orthogonal direction (Z), the orthogonal direction (Z) being orthogonal to both the drive direction (Y) and a longitudinal direction of the balance bar (150), the second stiffness being different than the first stiffness.

19. A method for assembling the Coriolis flow meter (700) as claimed in claim 18, wherein coupling the balance bar (150) to the brace bar (140, 140') further comprises:
coupling a first balance bar (150) to the brace bar (140, 140');
coupling a second balance bar (150') to the brace bar (140, 140'); and
coupling the first balance bar (150) to the second balance bar (150') using one or more brackets (160L, 160R, 161, 161').

* * * * *